SOUND RECORDING AND REPRODUCING DEVICE

Filed July 16, 1956

Inventors: Siegmund Loewe Werner Fern

United States Patent Office 3,029,033
Patented Apr. 10, 1962

3,029,033

SOUND RECORDING AND REPRODUCING DEVICE

Siegmund Loewe, 68 Ridge Road, Yonkers, N.Y., and Werner Zorn, Berlin-Zehlendorf, Germany; said Zorn assignor to said Loewe Filed July 16, 1956, Ser. No. 598,207
Claims priority, application Germany July 21, 1955
6 Claims. (Cl. 242—55.12)

Figures 1, 2:
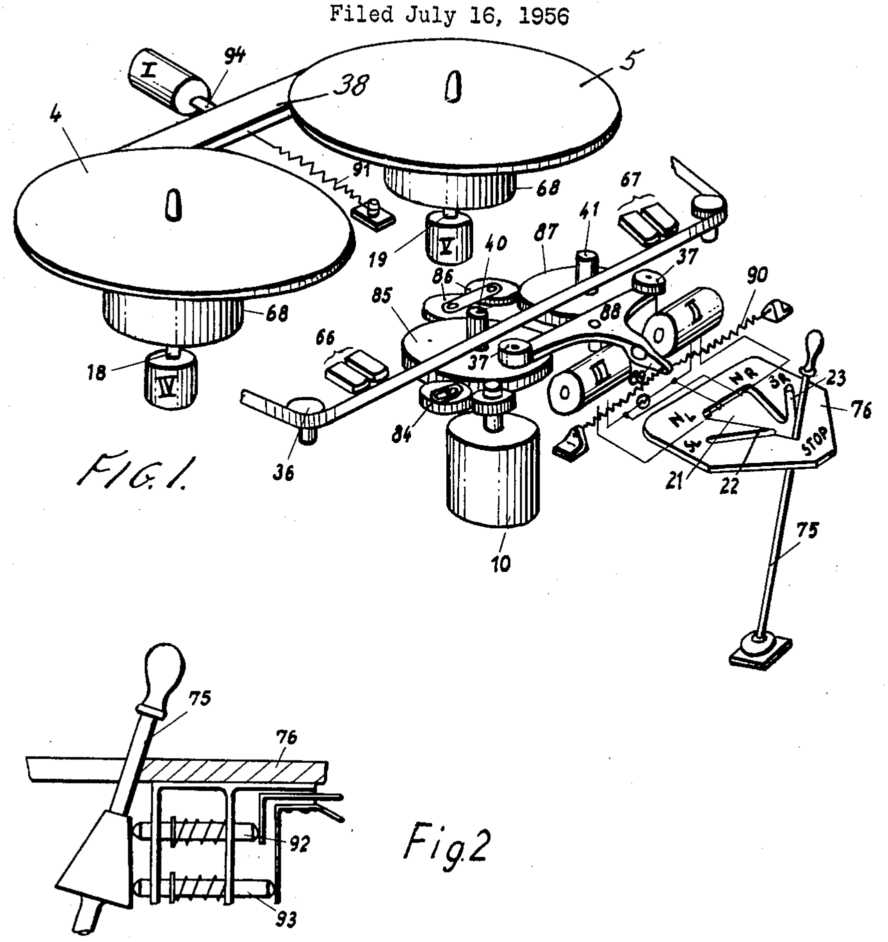

The switching functions, that is drive and operation of sound tracing and reproduction devices with wire and tape sound carriers, especially magnetic recording tapes, are operated partly mechanically, partly electrically by means of switching devices as turn-knobs, levers, keys, push-buttons and similar controls. Here, stop devices must be provided to prevent errors in switching. Such faulty switching could lead to damage or even destruction of the sound recordings.

With the increase in the various switching functions required and the growing independence of the switching devices from each other, the possibility of faulty switching becomes larger and, accordingly, the number of stop devices necessary. Thus, the set becomes complicated and expensive.

The invention refers to a magnetic sound recorder which unites a maximum of switching functions with a minimum of switching devices and which does not permit faulty switching.

The invention consists in a magnetic sound recording and reproducing device containing means for controlling the movement of a magnetic tape movable between two tape reels, said means comprising in combination: a hand-driven switching lever having a swivel-mounted end and a free end adapted to be moved by a user from the outside of said device, a non-movable switching plate containing a system of leading slots through which said switching lever projects near its free end, said leading slot system containing a middle line slot with two lateral ends on each of its sides—for the lever position "Normal Speed" (Left or Right) or "Rapid Speed" (Left or Right)—electric contact means in the ends of said slots adapted to be closed by moving said switching lever into said slot ends, two electro-magnetic coils each of which is adapted to be excited by an electric current closed by said contact means of one of said lateral ends of said middle line slot for "Normal Speed Left" or "Normal Speed Right," a swivel-mounted double-lever support, two pressure rolls mounted near the swivable ends of said support, two capstans rotatable in opposite directions each adapted to drive said tape in one of two possible directions, each of said rolls being adapted to be pressed to one of said capstans by a swivelling motion of said support, hereby including said tape between said capstan and said roll, a magnetizable, tongue-shaped armature on said support, said tongue-shaped armature being arranged near and between the ends of said electro-magnetic coils and movable into one of said positions pressing the rolls of said support to one of said capstans by a current flowing in one of said coils.

A third electro-magnetic coil may be provided together with contact means arranged in one end of said middle line slot—for the position "Stop"—and belonging to said third coil, the armature of which moves a brake shoe adapted to be pressed during the "Stop" position to the friction discs carrying the tape reels.

Additional springs may be arranged one end of each being fastened on non-movable parts of the device and the other end being secured on said tongue-shaped armature.

Furthermore, electrical or magnetical means are provided which hold the switching lever in its positions in the ends of the leading slots.

Figure 3:
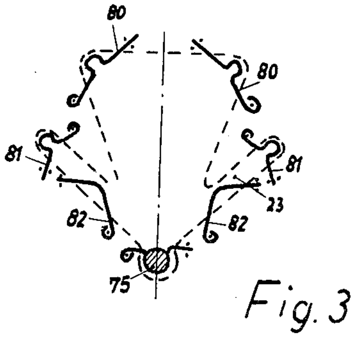
Figure 4:
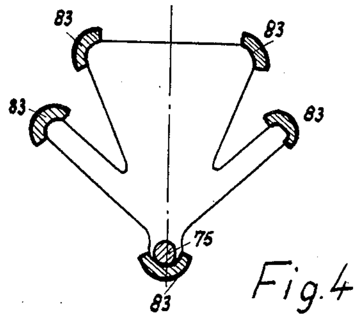

In the drawing:

FIG. 1 is a perspective view of a part of a magnetic sound recording and reproducing device containing the means for controlling the movement of the magnetic tape between two tape reels, FIG. 2 is a side view of the contact means arranged in the ends of leading slots in which said switching lever is moved by the user, FIGS. 3 and 4 are schematic views of said non-movable switching plate with said leading slots, wherein the ends of said leading slots contain means for holding the switching lever in said end positions.

According to FIG. 1, a motor 10 drives, via a friction wheel 84 and a balance weight 85, a capstan 40 and, via guide friction rolls 86, and a balance weight 87 a capstan 41 in opposite directions. Two pressure rolls 37 are fastened to a double-lever support 88 with swivel action in such a way that, with swivelling of the support, alternately one of the pressure rolls 37 is brought into contact with the adjacent capstan 40 or 41, and thereby the direction of a tape 1 running between two reels (not shown) carried by discs 4 and 5 and guided by rolls 36 is reversed. A tongue-shaped piece 89 capable of being magnetized, held in a centre position by springs 90, can be swivelled to one or the other side by magnetization of magnet coils II, III.

A braking shoe 38 is drawn by a spring 91 against friction discs 4, 5, thus effecting a stop of the friction discs and of the tape which can only be overcome by magnetization of a coil I moving a magnet core 94.

In a similar way, magnet cores connected with axles 18 and 19 of friction discs 4 and 5 carrying reels winding the tape 1 on or off are drawn into coils IV and V when the magnetizing current flows through them, and they effect in magnetical way an increase of the friction between the friction discs and a belt pulley, necessary to bring about high speed running.

In the end positions of leading slots 21 to 23 arranged in a switching plate 76 a switching lever 75 operates two contacts 92, 93, as this is shown schematically in FIG. 2.

Said contacts are arranged in electric circuits exciting one of the coils I to IV. In this connection, contacts are closed by the switching lever 75 in the left or right end of the leading slot 21 for "Normal Speed Left" ($N_L$) or "Normal Speed Right" ($N_R$), respectively, for exciting one of the coils II or III, respectively. For "Rapid Speed Left" ($S_L$) or "Rapid Speed Right" ($S_R$) the coils IV or V are excited, respectively. For the coil I a rest current contact may be provided at the "Stop" end of the slot 21, that means an exciting current for the coil I is opened by the contact means arranged at this "Stop" end of the slot 21.

The magnetic heads are designated as 66 for normal speed left and 67 for normal speed right.

In FIG. 3 there are shown clamp springs 80 and 81 which are adapted to keep the switching lever 75 in the ends of the leading slot 21 or in the ends of the slots 22, 23, respectively. Springs 82 are provided for preventing a non-intended movement of the lever 75 into one of the rapid speed positions.

In FIG. 4 the clamps 80, 81 of FIG. 3 are replaced by magnets or magnetizable parts 83 adapted to keep the lever 75 in each of the end positions of the slots 21, 22, 23, respectively. This lever 75 herein consists of a magnetic or magnetizable material, at least in the part which comes into contact with said parts 83.

What is claimed is:

1. In a magnetic sound recording and reproducing device, means for controlling the movement of a magnetic tape movable between two tape reels, said means comprising in combination: a hand-driven switching lever having a swivel-mounted end and a free end adapted to be moved by a user from the outside of said device, a non-movable switching plate containing a system of leading slots through which said switching lever projects near its free end, said leading slot system containing a middle line slot with two lateral ends on each of its sides—for the lever position "Normal Speed" (Left or Right) or "Rapid Speed" (Left or Right)—electric contact means in the ends of said slots adapted to be closed by moving said switching lever into said slot ends, two electro-magnetic coils each of which is adapted to be excited by an electric current closed by said contact means of one of said lateral ends of said middle line slot for "Normal Speed Left" or "Normal Speed Right," a swivel-mounted double-lever support, two pressure rolls mounted near the swivable ends of said support, two capstans rotatable in opposite directions each adapted to drive said tape in one of two possible directions, each of said rolls being adapted to be pressed to one of said capstans by a swivelling motion of said support, hereby including said tape between said capstan and said roll, a magnetizable, tongue-shaped armature on said support, said tongue-shaped armature being arranged near and between the ends of said electro-magnetic coils and movable into one of said positions pressing the rolls of said support to one of said capstans by a current flowing in one of said coils.

2. In a device according to claim 1 a third electro-magnetic coil, contact means arranged in one end of said middle line slot—for the position "Stop"—and belonging to said third coil, friction discs carrying said tape reels, a brake shoe adapted to be pressed to said friction discs, a magnet armature connected with said brake shoe and arranged near said third coil.

3. In a device according to claim 1 springs, one end of each being fastened on non-movable parts of the device and the other end being secured on said tongue-shaped armature.

4. In a device according to claim 2 a spring one end of which is fastened on a non-movable part of the device and the other end is secured on said brake shoe.

5. In a device according to claims 1 and 2 clamp springs arranged in the ends of said leading slots and adapted to keep said switching lever in its positions in said slot ends.

6. In a device according to claims 1 and 2, said switching lever being—at least at its parts moved in said leading slots—of a magnetic material, and magnets adapted to keep said switching lever being arranged in the ends of said leading slots.

References Cited in the file of this patent

UNITED STATES PATENTS

| | | |
|---|---|---|
| 2,676,212 | Williams | Apr. 20, 1954 |
| 2,706,637 | Cain | Apr. 19, 1955 |
| 2,732,144 | Jones | Jan. 24, 1956 |
| 2,813,686 | Schroter | Nov. 19, 1957 |